J. A. Lloyd,

Upsetting Tires,

N° 46,118. Patented Jan. 31, 1865.

Witnesses:
G. W. Hughes
E. N. Drury

Inventor:
John A. Lloyd
By his attorneys
Smith & Dodge

UNITED STATES PATENT OFFICE.

JOHN A. LLOYD, OF ST. PAUL, MINNESOTA.

IMPROVED TIRE-SHRINKING MACHINE.

Specification forming part of Letters Patent No. 46,118, dated January 31, 1865.

*To all whom it may concern:*

Be it known that I, JOHN A. LLOYD, of St. Paul, in the county of Ramsey and State of Minnesota, have invented a new and useful Machine for Upsetting or Shortening Tires; and I do hereby declare the following to be a full, clear, and exact description of the same, reference being had to the accompanying drawings, in which—

Figure 1:
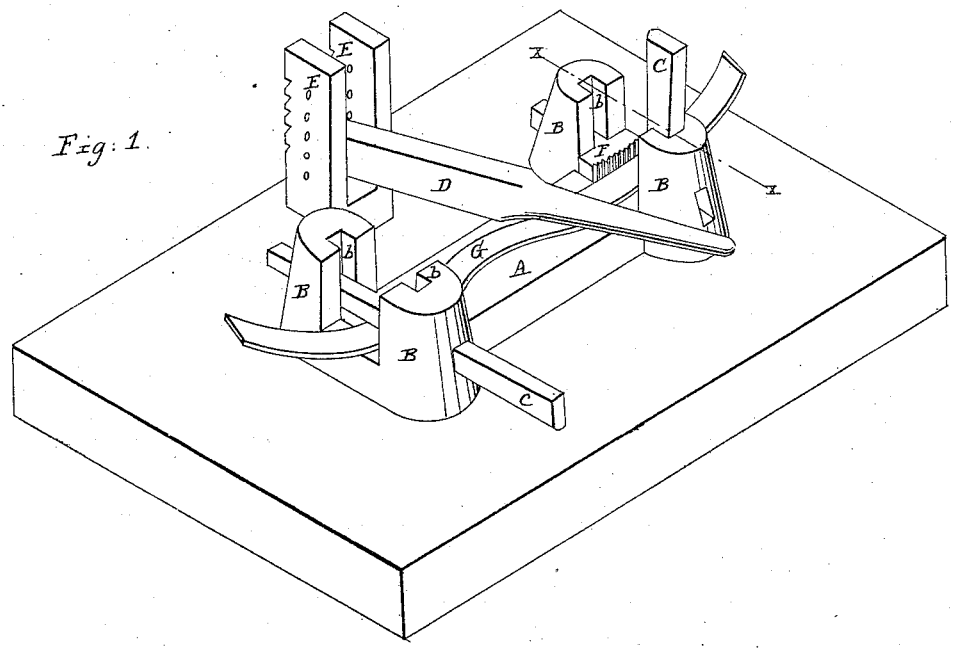
Figure 2:
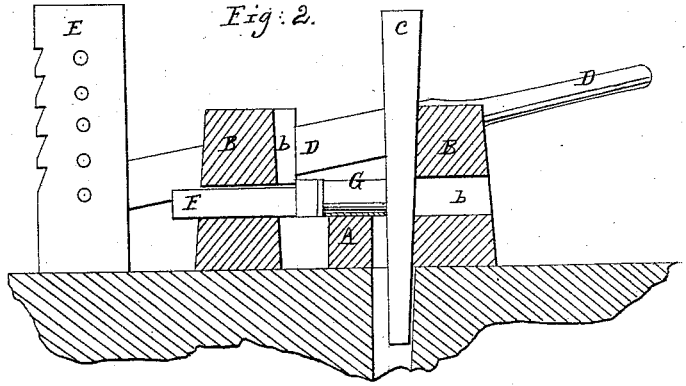
Figure 3:
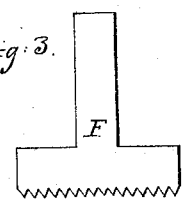

Figure 1 is an isometrical view of my machine. Fig. 2 is a vertical transverse section through one of the head-blocks on line *x x*. Fig. 3 is a plan of one of the serrated clamping-plates.

The nature of my invention consists in such an arrangement of keys and other devices as enables the operator to secure firmly the tire or other bar in the most advantageous position or manner, and also the arrangement of a lever by means of which the tire or bar may be upset without the aid of a hammer.

That others skilled in the art may understand the construction and operation of my invention, I will particularly describe it.

A is the bed-plate.

B B are vertically and laterally projecting lugs containing the key-seats *b b*. The lugs B and the bed plate may be cast in one piece, with the perforations for the key-seats *b* cored out.

C C are the keys, made in the ordinary manner.

D is the lever, used to compress the heated metal, and thus obviate the necessity of using the hammer.

E E are the standards between which the lever is pivoted.

F is a serrated clamping-plate, which may be used when it is desirable to compress or secure the tire or bar by its sides.

G is a portion of a wagon-tire, showing the mode of securing the same, and also the mode of shortening it.

The bed-plate A may be secured to any suitable support, as a table or a simple plank, and in any suitable manner. The lugs B are perforated both vertically and horizontally, as is fully shown in Figs. 1 and 2, so that keys may be introduced either way, as it may be desirable, to pinch the tire or bar upon its upper surface or upon its sides. If it proves difficult to hold the tire or bar by means of simple key-pressure the serrated plate F may be used, its tang being passed through the key-hole of one lug, and the back of the plate bearing firmly against the face of the lug, as shown in Fig. 1. The serrations upon the face of the plate F bite into the metal of the tire or bar and effectually prevent its slipping. The face of the keys are frequently made with an edge, as shown in my drawings, for the purpose of biting into the metal in the same way, but it is not always desirable to exert sufficient pressure upon the bar to enable one edge to hold it in this way.

The operation of my invention is as follows: The tire or bar to be upset or shortened is heated and buckled or bent inwardly; then, while still sufficiently hot, is clamped and secured in the machine in the manner indicated, the buckle being midway between the lugs and immediately under the lever D. The said lever is then brought down upon the heated metal with sufficient force to flatten the buckle down upon the bed-plate, by which it is manifest the metal must be compressed and therefore made shorter. This is an operation the nature of which is well understood, and no further explanation is therefore necessary.

Having described the construction and operation of my machine, what I claim as new, and desire to secure by Letters Patent of the United States, is—

1. Constructing the lugs B B with horizontal and vertical key-seats, so that the article to be secured may be pinched either upon its horizontal or vertical surfaces, at pleasure.

2. In combination with the bed-plate A of a machine for shortening tires, the lever D, lugs B B, and keys C C, substantially as described, and for the purpose set forth.

JOHN A. LLOYD.

Witnesses:
 D. D. MERRILL,
 GEO. E. JENKS.